United States Patent
Hart

(10) Patent No.: US 12,254,501 B1
(45) Date of Patent: *Mar. 18, 2025

(54) METHODS AND SYSTEMS FOR MATCHING A TARGET COLOR WITH A PRODUCT COLOR

(71) Applicant: Hoppn, Inc., Manhattan Beach, CA (US)

(72) Inventor: Bridger Hart, Hermosa Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,035

(22) Filed: Apr. 18, 2024

Related U.S. Application Data

(63) Continuation of application No. 17/724,466, filed on Apr. 19, 2022, now Pat. No. 12,020,306.

(51) Int. Cl.
| | |
|---|---|
| *G06Q 30/00* | (2023.01) |
| *G06F 16/9538* | (2019.01) |
| *G06Q 30/0601* | (2023.01) |
| *G06T 7/90* | (2017.01) |
| *G06F 3/04842* | (2022.01) |

(52) U.S. Cl.
CPC ..... *G06Q 30/0627* (2013.01); *G06F 16/9538* (2019.01); *G06Q 30/0643* (2013.01); *G06T 7/90* (2017.01); *G06F 3/04842* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 8,582,802 B2 * | 11/2013 | Clippard | G06V 10/758 |
| | | | 382/100 |
| 10,296,960 B1 * | 5/2019 | Gyllstrom | G06Q 30/0631 |
| 10,430,857 B1 | 10/2019 | Haitani et al. | |
| 10,691,744 B2 | 6/2020 | Dorner et al. | |
| 11,663,642 B2 | 5/2023 | Sollami et al. | |

(Continued)

OTHER PUBLICATIONS

Tim Mouw "LAB Color Values / Color Spaces" Oct. 8, 2018. Retrieved from https://www.xrite.com/blog/lab-color-space (Year: 2018).*

(Continued)

*Primary Examiner* — Kathleen Palavecino
(74) *Attorney, Agent, or Firm* — Cislo & Thomas, LLP

(57) ABSTRACT

The present systems and methods permit users to select a custom color which serves as a target color, with millions of possible combinations; then filter a product search by the selected color. The target color and the product color are each expressible as a coordinate in a color space; and distance between the target color coordinate and the product color coordinate is calculated to determine the color code distance for each product in the search result, potentially numbering the thousands. Descriptions of the products are presented in the GUI, in order of the calculated color code distance for each product, where a smaller color code distance indicates a closer match to the target color code. The user can easily choose a product type and a desired or target color using a color picker, and receive a search result including only products sufficiently matching the target color.

21 Claims, 10 Drawing Sheets
(6 of 10 Drawing Sheet(s) Filed in Color)

(56) References Cited

U.S. PATENT DOCUMENTS

2014/0344115 A1* 11/2014 Yatsuda ................ G06F 16/951
　　　　　　　　　　　　　　　　　　705/26.63
2016/0321732 A1* 11/2016 Yonaha ................ G06F 16/285
2022/0067976 A1　　3/2022 Gershon

OTHER PUBLICATIONS

KyoungHee Son et al. "Color Sommelier: Interactive Color Recommendation System Based on Community-Generated Color Palettes" UIST '15 Adjunct: Adjunct Proceedings of the 28th Annual ACM Symposium on User Interface Software & Technology Nov. 2015 pp. 95-96. (Year: 2015).

* cited by examiner

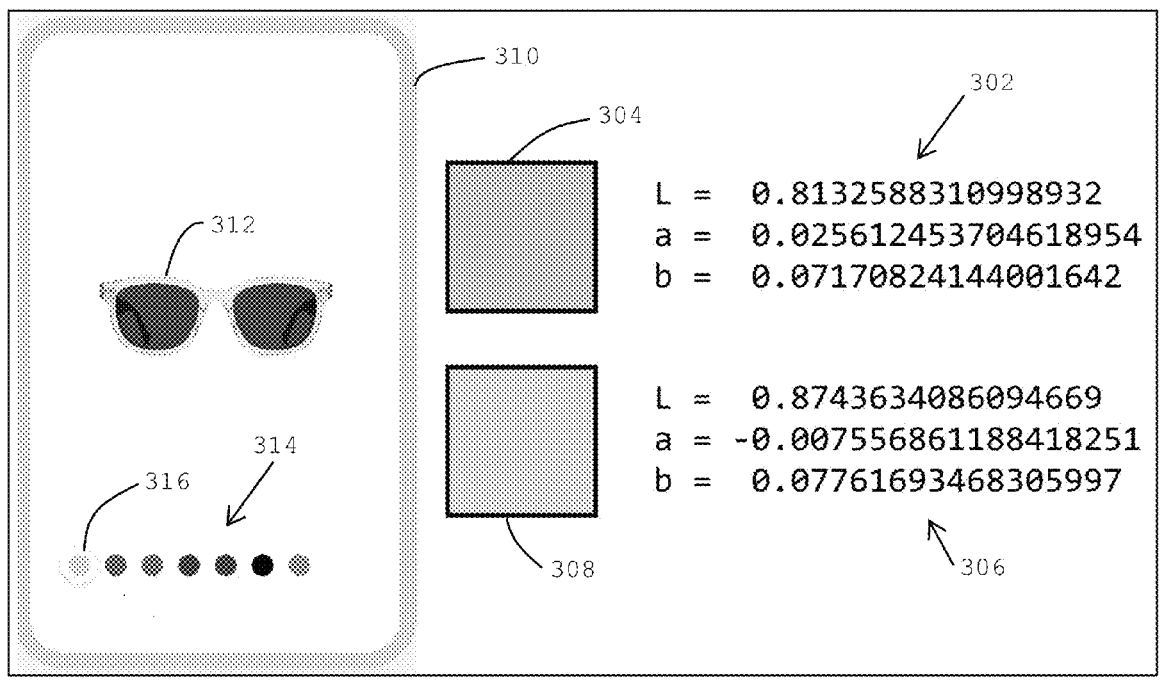
FIG. 3
$$\Delta E = \sqrt{(L_2 - L_1)^2 + 8(a_2 - a_1)^2 + 8(b_2 - b_1)^2}$$
FIG. 4
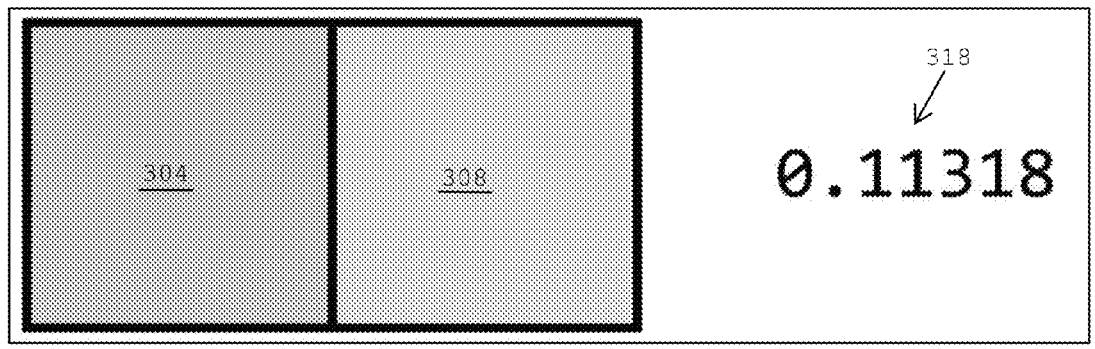
FIG. 5

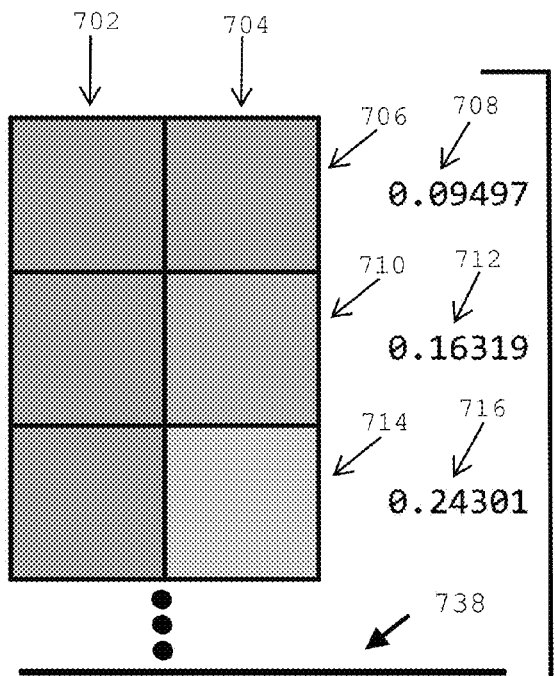
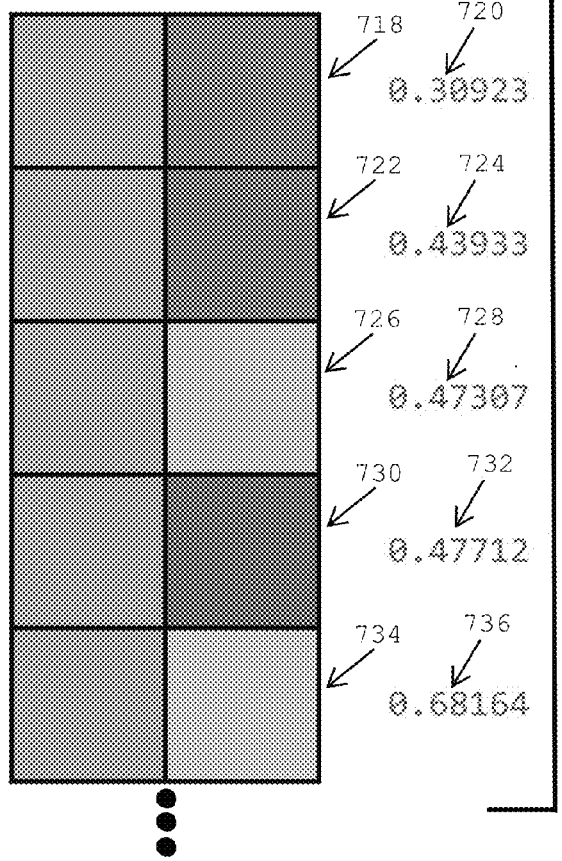
FIG. 7
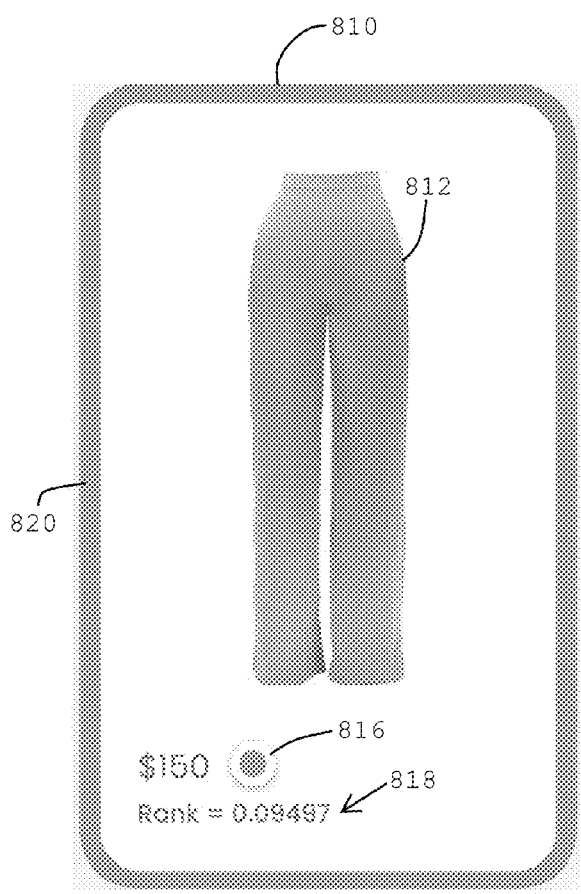
FIG. 8

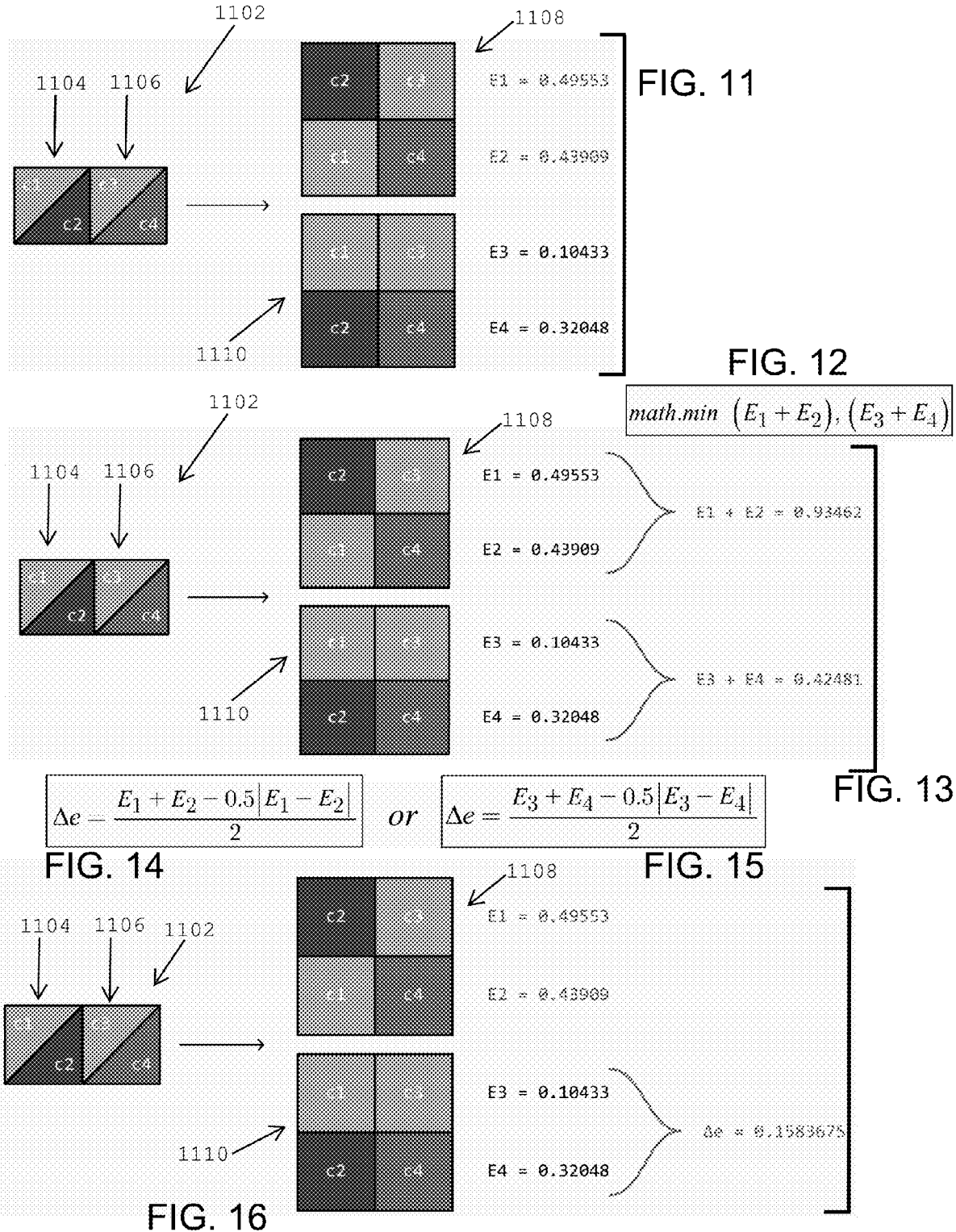

METHODS AND SYSTEMS FOR MATCHING A TARGET COLOR WITH A PRODUCT COLOR

CROSS REFERENCE TO RELATED APPLICATION

This application is a continuation of U.S. patent application Ser. No. 17/724,466, filed Apr. 19, 2022, which is incorporated in its entirety here by this reference.

TECHNICAL FIELD

The subject matter disclosed herein generally relates to methods, systems, and programs for matching a color selection with a product color, and, more particularly, methods, systems, and computer programs for searching for particular products with one or more colors matching the color selection.

BACKGROUND

By way of background, when searching for objects online, the user often wishes to search for a particular color, especially for fashion-related products. Currently, users may enter or select a color name from a given list of color names, such as "red", "blue", "beige", "light gray", and so on. Manufacturers, distributers, wholesalers, store owners, site operators, etc. will manually tag the item with the name of the dominate color or colors. Since there are so few color names, and a multitude of products that may result from a product plus color search, the user will still need to shift through many types of "brown" to get to the shade of brown they are seeking. Essentially, a color name represents too broad a category for many to sift through.

Therefore, there is a need for a more exact means to define a color that is controlled by the user. This means of color selection should not be so broad as to return too many results; nor too narrow, such that many products are not shown.

SUMMARY

Aspects of the present systems and methods teach certain benefits in construction and use which give rise to the exemplary advantages described below. The present methods (and systems for implementation thereof) include receiving a product search request that is limited by a target color code coordinate locatable within a color space. The product search request is processed to retrieve a plurality of product descriptions from one or more databases associated with the server and storing the plurality of product descriptions, each of the plurality of product descriptions comprising a product color code coordinate locatable within the color space. The color space distance between the target color code coordinate and each of the product color code coordinates is calculated. The search result comprising the plurality of product descriptions presented in respective order of the color space distance in the graphical user interface.

Other features and advantages of aspects of the present systems and methods will become apparent from the following more detailed description, taken in conjunction with the accompanying drawings, which illustrate, by way of example, the principles of aspects of the invention.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 3 is an example product search result, where the target color code is compared to the product color code;

FIG. 4 illustrates an example formula for calculating the distance between the target and product color code coordinates;

FIG. 5 visually compares schematic color swatches of the target and product color code with the calculated color space distance utilizing the formula of FIG. 4;

FIG. 7 visually compares schematic color swatches of the target and product color codes with the color space distances calculated for each of a plurality of products, showing the cutoff where some product color codes extend beyond the maximum color space distance permitted;

FIG. 8 is the example graphical user interface illustrating an example product search result that was ranked highest due to having the shortest color space distance for the given search result;

FIG. 11 visually compares schematic color swatches of the target and product color codes with the color space distances calculated for each of the color swatch combinations of a two-tone color search;

FIG. 12 illustrates the math.min function for determining the smallest of the two added color pairs;

FIG. 13 visually compares schematic color swatches of FIG. 11, further analyzing the added color pairs with the function of FIG. 12;

FIG. 14 illustrates an example formula for calculating the merged color space distance;

FIG. 15 illustrates a further example formula for calculating the merged color space distance;

FIG. 16 visually compares schematic color swatches of the target and product color codes with the merged color space distance of a two-tone color search;

The above-described drawing figures illustrate aspects of the present system in at least one of its exemplary embodiments, which are further defined in detail in the following description.

DETAILED DESCRIPTION

Example methods, systems, and computer programs are directed to product or item search with the ability to limit the search to a custom color code and colors within a predetermined range of the custom color code. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Computer networks are well known in the art, often having one or more client computers and one or more servers, on which any of the methods and systems of various disclosed embodiments may be implemented. In particular the computer system, or server in this example, may represent any of the computer systems and physical components necessary to perform the computerized methods discussed in connection with the present figures and, in particular, may represent a server (cloud, array, etc.), client, or other computer system upon which e-commerce servers, websites, databases, web browsers and/or web analytic applications may be instantiated.

Figure 1:
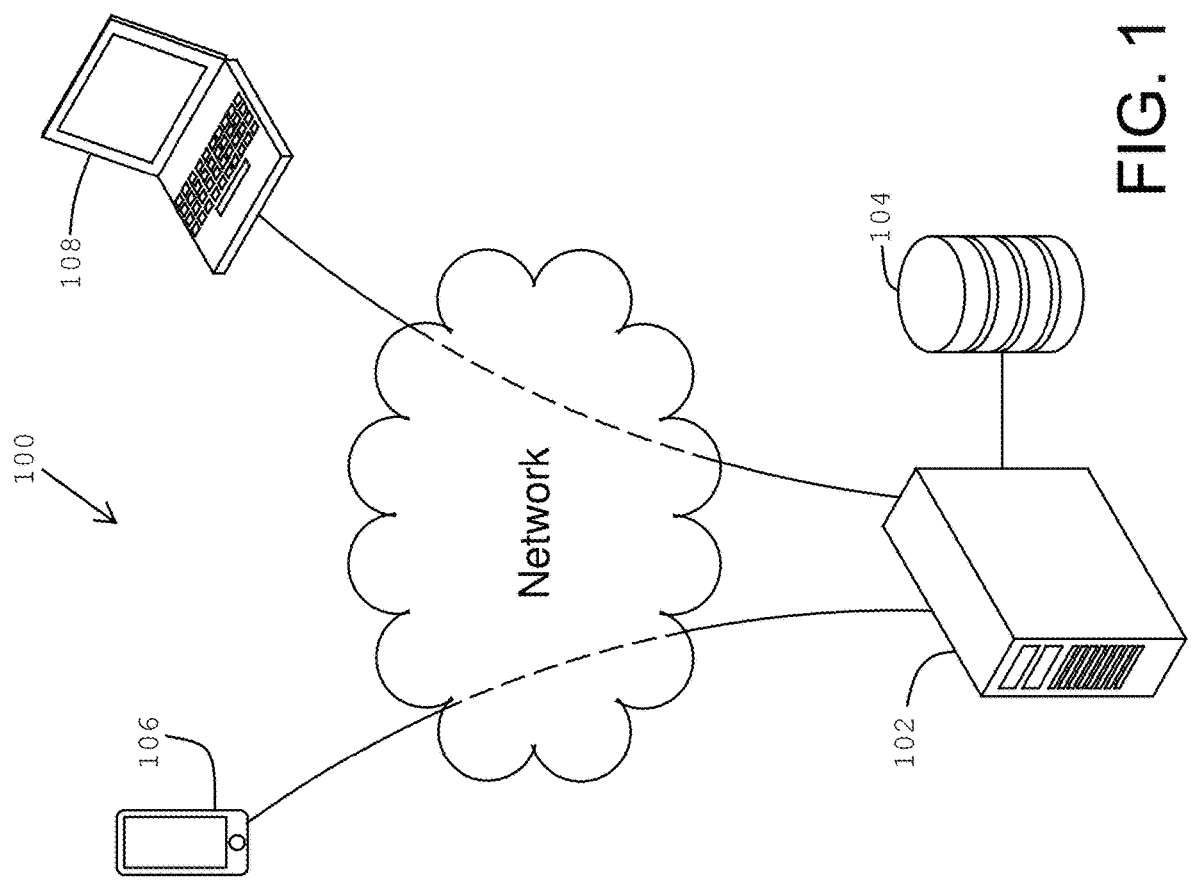
FIG. 1 is an architecture of a system for implementing product color search, according to some example embodiments.

The illustrated exemplary server 102 with associated database 104 of the system 100 in FIG. 1, the user devices 106, 108 (which also may be described as client computers, computing devices, devices, etc.) are generally known to a person of ordinary skill in the art, and each may include a processor, a bus for communicating information, a main memory coupled to the bus for storing information and instructions to be executed by the processor and for storing temporary variables or other intermediate information during the execution of instructions by processor, a static storage device or other non-transitory computer readable medium for storing static information and instructions for the processor, and a storage device, such as a hard disk, may also be provided and coupled to the bus for storing information and instructions. Two user devices are illustrated to show how multiple user can query the present system 100 or how a third party may communicate with the server 102 to designate color codes for products stored in the present system 100.

The server 102 and client computers 106, 108 may optionally be coupled to a display for displaying information. However, in the case of servers 102, such a display may not be present and all administration of the server may be via remote clients. Further, the server 102 and client computers 106, 108 may optionally include connection to an input device for communicating information and command selections to the processor, such as a keyboard, mouse, touchpad, microphone, and the like.

The server 102 and client computers 106, 108 may also include a communication interface coupled to the bus, for providing two-way, wired and/or wireless data communication to and from the server and/or client computers. For example, the communications interface may send and receive signals via a local area network, public network, private network (e.g., a VPN), or other network, including the Internet.

In the present illustrated example, the hard drive of the server 102 and/or one or both of the client computers 106, 108 is encoded with executable instructions, that when executed by a processor cause the processor to perform acts as described in the methods of figures. The server 102 communicates through the Internet, intranet, or other network with the client computers 106, 108 to cause information and/or graphics to be displayed on the screen, such as HTML code, text, images, and the like. The server 102 may host the URL site with information, which may be accessed by the client computers 106, 108. Information transmitted to the client computer may be stored and manipulated according to the methods described below, using the software encoded on the client device. Although the computing devices are illustrated schematically as laptops, the computing devices may include desktops, tablets, cellular devices (e.g., smartphones, such as iOS devices, ANDROID devices, WINDOWS devices, and the like), or any other computing device now known or later developed. Application server 102 in this example, may represent any of the computer systems and physical components necessary to perform the computerized methods discussed in connection with the figures and, in particular, may represent a server, client or other computer system upon which e-commerce servers, websites, web browsers and/or web analytic applications may be instantiated.

The user device 106, 108 may be one of many available computing devices capable of running executable programs and/or a browser instance, such as a tablet computer or a mobile phone device with computer capabilities, a laptop, a desktop, or other computing device. Executable instructions for the present method may be installed on the server 102 that hosts a web application caused to display a user interface on one or both of the user devices 106, 108. Alternatively, executable instructions for at least part of the present method may be installed locally on one or both of the user devices 106, 108. Further, a separate set of executable instructions for at least part of the present method may be installed locally on each of the user devices 106, 108. In a first example embodiment, the user devices 106, 108 access and interact with the graphical user interface through a web browser instance, such as FIREFOX, CHROME, SAFARI, INTERNET EXPLORER, and the like, or through a desktop application. The web application is hosted on an application server with application hosting capabilities. In a second example embodiment, user devices 106, 108 access and interact with the graphical user interface through either a web application running on a mobile web browser or a mobile application (commonly called an "app"). Generally, the present method and system relies on the use of mobile devices which are readily and commonly movable from place to place, carried on the person, which can, in some examples, encompass a laptop or the like. However, the system can still be accessed at a later time (e.g., at home or in the office) by a less mobile desktop or laptop computer.

Alternatively, executable instructions for carrying out at least part of the present method may be installed locally on one or both of the user devices 106, 108. For example, one or both of the user devices 106, 108 may be required to locally install an application on the smartphone device for carrying out all or part of the present method. In an example embodiment, an executable application file is installed on each of the user devices 106, 108, so that messages can be sent to and received from the server 102, with the server sending, receiving, and/or relaying the messages to one or both of the user devices 106, 108. The messages may be comprised of various forms of data, such as alpha-numeric text, pictures, links, and so on. In yet another example embodiment, one party may have an application installed on the computing device, while the other party sends and receives messages through a browser instance.

In some implementations, a novel user interface is provided for permitting users to select a custom color which serves as a target color, with millions of possible combinations; then filter a product search by the selected color. The target color and the product color are each expressible as a coordinate in a color space (such as a three-dimensional color space). A distance between the target color coordinate (as designated by the user) and the product color coordinate (generally predefined within the product description data) is calculated to determine the color code distance for each product in the search result. Images of products or other items (i.e., images of products or items, whether for sale or not) are presented within the search result portion of the graphical user interface, in order of the calculated color code distance for each product. A smaller color code distance indicates a closer match to the target color code. A maximum color code distance can be predetermined within the system or set by the user to exclude color code distances beyond the maximum color code distance (i.e., excluding lesser matching colors). In this way, the user can easily choose a product type and a desired or target color using a color picker or the like, and receive a search result including only products sufficiently matching the target color.

Figure 2:
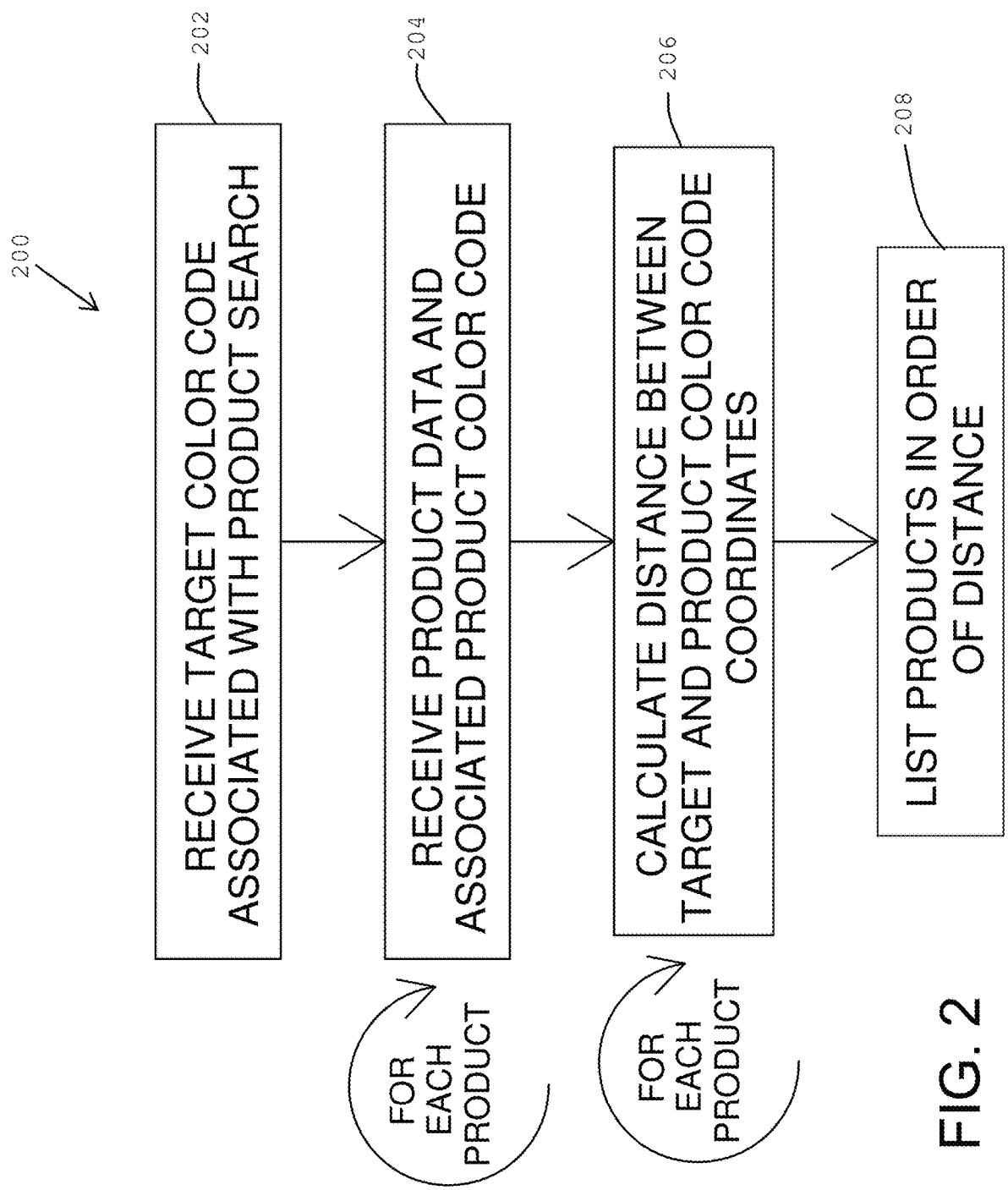
FIG. 2 is flowchart of a method for matching a target color code to a product color code in a search, according to some example embodiments.

FIG. 2, is flowchart of a method 200 for determining the color space distance between a target color and a product color in order to present the product with the closest color matches before the poorer color matches, according to some example embodiments. While the various operations in this flowchart are presented and described sequentially, one of ordinary skill will appreciate that some or all of the operations may be executed in a different order, be combined or omitted, or be executed in parallel.

Through the graphical user interface of a user's computing device, the user is presented search tools which, in one or more embodiments, include a color picker tool (e.g., a color field, an eye dropper, a slider, etc.), a text search box, filter categories, and so on. The user enters a product search, which can include all products in the system (i.e., not limiting the product search in any way by text or filtering) to text searches alone or with one or more filters applied. The product search may be pre-defined; for example, when the user has navigated to a particular product section of the site, such as "women's shoes". Along with the product search, the user enters a color selection using one or more coloring picking tools or other known means to select or enter a color (e.g., such as manually entering the red, green, blue or RGB values into text fields).

At operation 202, the target color code coordinate and product search request is received at the server. In one or more embodiments, the target color code coordinate may require conversion to a standard color code compatible with the present system or may already be in a compatible format. Further, the present system, in one or more embodiments, can autodetect the target color code coordinate and convert it to a compatible format or adjust the formulas according to the target color code format. In one or more example embodiments, if the target color code coordinate data received from the user's device is in red, green, blue or RGB format (where RGB is not compatible in this example), methods are provided to convert RGB to, for example, to the Lab color space (where "L" is the perceived lightness, "a" is the red/green value, and "b" is the blue/yellow value).

In one or more examples, a script is provided by OKLAB to convert the RGB values to Lab values, in which "L" is a first coordinate component, "a" is a second coordinate component, and "b" is a third coordinate component within the OKLAB color space. The Lab coordinates, in this example embodiment, act as coordinates within a three-dimensional Cartesian coordinate system. However, any system of color code coordinates can be used, if the distance between the target color code coordinate and the product color code coordinates.

In one or more embodiments, the target color code coordinate (or simply a target color code) is received from the user's device in HSL (hue, saturation, lightness) (or OKHSL), which is then converted to OKLAB color coordinates. In one or more embodiments, the target color code coordinate is received from the user's device in HEX, which is then converted to OKLAB color coordinates. Of course, other color code systems may be converted by the present system to OKLAB or any other compatible color code. Additionally, coordinate systems other than Cartesian coordinate systems can be used, such as polar coordinate systems, cylindrical coordinate systems, and the like.

At operation 204, the plurality of product descriptions from one or more databases is retrieved from a database in response to the product search request, where each of the plurality of product descriptions comprises a product color code coordinate. In one or more embodiments, the product color code coordinate is determined in a prior process, such as by manual entry of the color code, manual selection by eye dropper selecting a point within the product photo that represents the primary color of the product, or other known means for assigning and associating one or more color codes to a product and saving it to the product descriptions dataset within the database. In one or more embodiments, a color measurement device can be used to measure the color sensed on the physical product (i.e., measuring the color of the material that is used in an item of clothing or measuring the item of clothing itself, post manufacturing). The product datasheet or other means of storing and communicating the measured color code can be included in the product packaging or product data stored on the manufacturer's web site and available to vendors. Thus, in one or more embodiments, for each product description that matches the product search request, the product color code is also retrieved.

At operation 206, a color space distance is calculated between the target color code coordinate and each of the product color code coordinates associated with the plurality of product descriptions. Because each product description retrieved as a result of the product search is analyzed by the present algorithm, many thousands of calculations may need to be done in the course of a few seconds. In one or more embodiments, the distance is calculated in three-dimensional color space using a Euclidean distance formula to calculate the magnitude of the distance between the Lab coordinates of the target color code coordinate and each of the Lab coordinates of the product color code coordinate. In one or more embodiments, the distance formula can be expressed as:

$$\Delta E = [x_1(L_2-L_1)^2 + x_2(a_2-a_1)^2 + x_3(b_2-b_1)^2)]^{1/2}$$

In this equation, it does not matter whether the target color code Lab coordinates is coordinate component 1 or coordinate component 2 (as indicated in the subscript numbers of the equation); the opposite coordinate components will be assigned to the product color code Lab coordinate. As can be seen, each of the three portions of the above equation can be multiplied by $x_1$, $x_2$, or $x_3$, which tends to emphasize or deemphasize these respective portions if the value is not 1. In one example embodiment, $x_2$ and $x_3$ can be each set to the number 8 (or another number) and $x_1$ set to 1 (or another number), to give a truer result, by prioritizing differences in chroma to be more important than differences in lightness.

Although specific formulas are provided as portions of the present algorithm, methods, and system, these are merely exemplary formulas which may be modified or replaced with alternative formulas or other measurement means to determine the color space distance (however many dimensions, 2-D, 3-D, etc.) for automatically comparing a target color to a product color. For example, if a more limited variety of colors are presented to the user in the form of, for example, a color picker comprising discrete squares, hexagons, etc. (or discrete regions within a continuous color space visible or not visible to the user), the products can be preassigned to a lookup table that has predetermined color space distances for each product that have to be calculated prior to the user's search. Thus, the product description data for each product within the present system can include a lookup table comparing the product color to each discrete color region available within the color picker, where each lookup table can compare hundreds or more colors to potential target colors, with a color space distance or equivalent thereof for each potential target color. Of course, these discrete regions within the color space can be made smaller or larger, so that the lookup tables have more or less color space distances recorded. Potentially, thousands of potential target colors can be included in a lookup table, if desired.

At operation 208, in one or more embodiments, after calculating the color space distance between the target color code coordinate and each of the product color code coordinates, the product search results are ordered from smaller color space distance magnitude (e.g., indicating a closer match to the target color) to larger color space distance magnitude (e.g., indicating a lesser match to the target color). These product descriptions are presented to the user in the GUI in this order, to give the more pertinent products that are closer in color to the target color higher priority, visually in the GUI.

Looking now at FIGS. 3-6, an example search result is illustrated as would be displayed in the present GUI, and is restricted only by color and not by a product search. Thus, if the user does not enter a particular product category, the product search request can be presumed or preset to be "all products" within the system (e.g., not restricted to women's fashion, nor by shirts, not by shoes, and so on). FIG. 3 illustrates an example comparison between the target color code Lab coordinate 302 (shown as the target color swatch 304) and the product color code Lab coordinate 306 (shown as the product color swatch 308). In this example, the product 310 is a pair of sunglasses 312; where, although each of the product's known color variations 314 are calculated to determine their respective color space distances, the first color variation 316 is calculated in the example, using the formula of FIG. 4. FIG. 5 illustrates the target color swatch 304 (i.e., the color chosen by the user) is shown by the product color swatch 308, to illustrate that they are both shades of beige and are relatively close in color. The color space distance 318 is calculated as 0.11318. If another product in the search result is lower than 0.11318, then that product may be displayed higher in the search result displayed to the user, unless other filters are applied to force-rank product 310 higher (e.g., perhaps the user further restricts the results to sunglasses or an advertised or promoted product is placed first, etc.).

Figure 6:
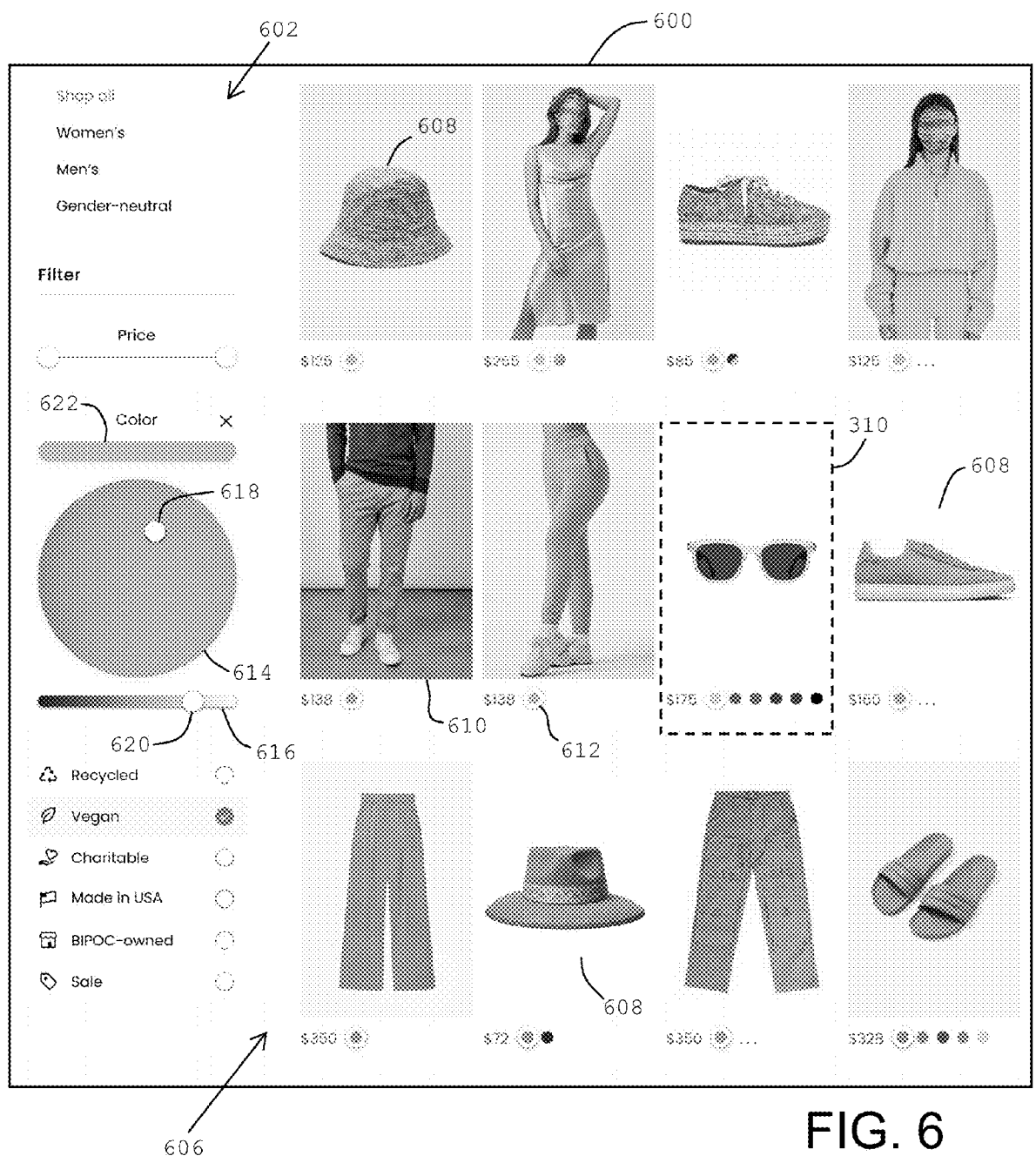
FIG. 6 is an example graphical user interface illustrating the present color picker and product search result sorted in order of closeness of color match.

FIG. 6 illustrates an example graphical user interface (GUI) 600 with a search field 602 positioned on the left of the browser or application instance and the search results field 606 positioned on the right side of the browser or application instance. Within the search results field 606 is one or more product descriptions 608, which can include one or more of an image 610 of the product, a product color swatch 612, the price of the product, the brand name of the product, and the like. Additional information can optionally be displayed to the user, such as the side-by-side swatch comparison as shown in FIG. 5, the color space distance or approximation or representation thereof. Although the product descriptions are shown as being in a grid-like pattern, they can be displayed in various ways, including a list, one at a time (e.g., where the user swipes a touchscreen or clicks an arrow to move to the next product description), or any manner of effectively displaying the plurality of product descriptions ordered from smallest to largest color space distance (or an alternative order determined or selected by the user).

Looking more closely at the search field 602, various filter categories (e.g., women's, men's, gender-neutral, recycled, vegan, price range, and so on) are presented to permit the user to filter or otherwise limit the search parameters. A text box for receiving alpha-numeric search terms entered by the user can also be provided. A color field or canvas 614 is included to permit the user to move the selector circle 618 to an appropriate color within the color field 614, in, for example, RGB format. The user can further manipulate the slider tool 616 by sliding the selector circle 620 left or right to adjust a color value, such as the hue, saturation value (HSV). Further, RGB, HEX, or other color values can be manually entered by the user by typing the various values within text boxes (not shown) provided adjacent to the value name. A chosen color display field 622 can be provided so that the user can view the color adjustments in real-time.

In one or more embodiments, the product search results can be displayed in real-time or as quick as can be retrieved as the color choice is selected. Alternatively, the chosen color or target color must remain static for a given period of time (e.g., 1 or 2 seconds) for the search result to be displayed. Or, a "search" button must be selected in order to retrieve the search results. Although not illustrated, an eye dropper tool can be provided so that the user can select a color from an image displayed in the GUI (e.g., if the user likes a shoe color, but wants a shirt in a similar color, the color of the shoe can be captured by the eye dropper tool).

Figure 9:
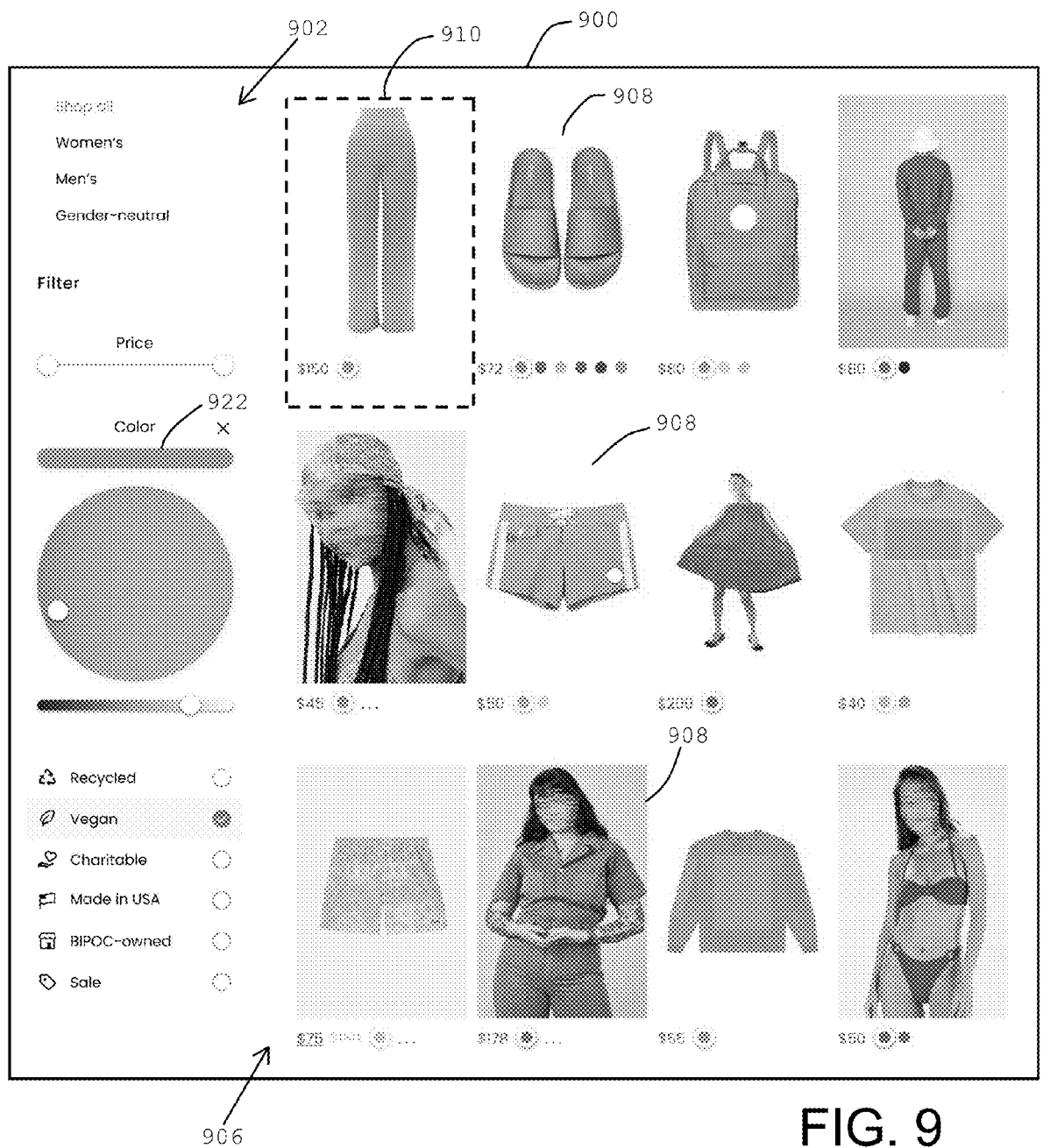
FIG. 9 is the example graphical user interface illustrating the present color picker and product search result, with the product of FIG. 8 illustrated first.

FIGS. 7-9 illustrate yet another search result in the present GUI 900, and like FIG. 6, the GUI 900 of FIG. 9 includes the search field 902 and the search result field 906 with a plurality of product descriptions 908. Product 910, which illustrates a pair of pants, is positioned as the top result in terms of color matching. In other words, the color space distance between the product color code coordinate and the target color code coordinate (as displayed in the color display field 922) is smallest when compared to the rest of the product colors within the search results. In FIG. 8, product 810, which are a pair of pants 812, can be presented in magnified view within a border 820 (which can be optionally colored with the product color as given in the product color indicator 816. Optionally, the color space distance (which is 0.09497 in this example) can be displayed as a raw number result of the equation of FIG. 4 or a processed rank indicator, such as a number, percentage match, or the like.

FIG. 7 visually illustrates a side-by-side comparison of target color swatches (first column 702) and product color swatches (second column 704), which would not generally be required for the color space distance calculations nor would it be generally shown to the user. However, it is useful to visually understand how lower values for the color space distance (as calculated by the formula of FIG. 4 or a similar formula for calculating distance in the color space) are a closer match to the target color than swatches with higher values for the color space distance. Here, the color swatch pairs 706, 710, 714 have respective color space distances 708, 712, 716 equal to 0.09497, 0.16319, and 0.24301. Each one of these values is below a maximum color space distance value of 0.3, as indicated visually by line 738. Below line 738 are color swatch pairs 718, 722, 726, 730, 734 which have respective color space distances 0.30923, 0.43933, 0.47307, 0.47712, and 0.68164.

It can be seen that, as the color space distance or ΔE increases, the product color wanders substantially from the target color, such that in color swatch pair 734, the target color is closer to an aqua or turquoise color, while the product color is closer to a golden yellow color. It can even be seen that in color swatch pair 718 the product color has too much green to be traditionally considered a blue tone. Although the maximum color space distance value is 0.3 in the present example (i.e., in order to be presented to the user in a search result, the color space distance must be less than or equal to 0.3 or just less than 0.3, depending on the instruction), the color space distance can be set to a lower or higher maximum value. Potentially thousands of products are automatically analyzed and ranked in this manner using the present system and methods.

FIGS. 10-17 illustrate a method for matching colors when the user is looking at two-tone products (e.g., where there is a dominant color and a secondary color or colors, as determined by the color codes assigned to the product, as described above). Many products have multiple colors. Even if the product has two or more colors, the product may only be assigned a dominant color code for the purposes of the above-search methods. Alternatively, the product can be assigned two color codes, either representing two colors roughly equal in representation on the product or by assigning one as a dominant color and the other as a secondary or trim color. For example, a ringer T-shirt may have a collar and arm band that include contrast bands on the neckline and sleeve hems that have different colors than the more dominant body of the t-shirt.

Figure 17:
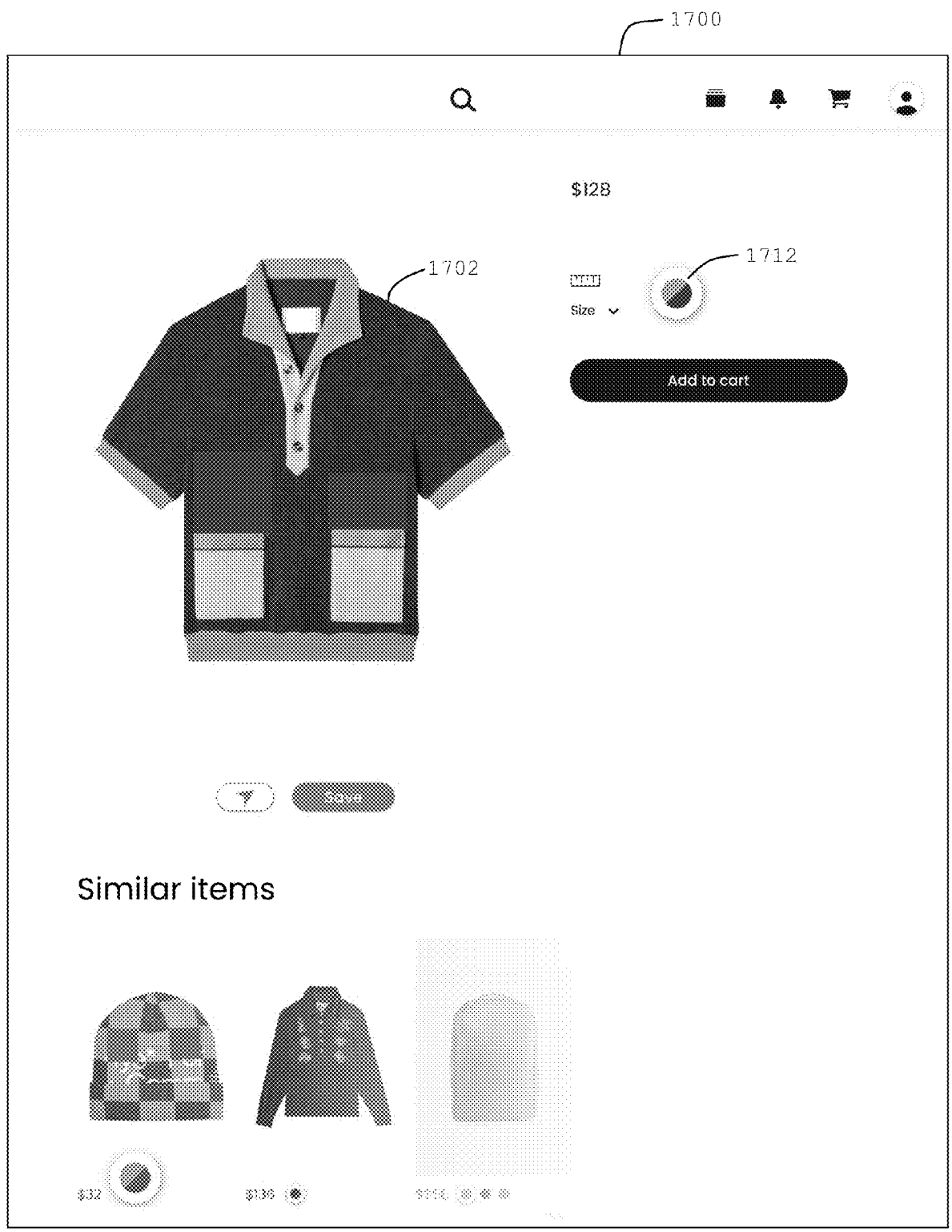
FIG. 17 is the example graphical user interface illustrating a two-tone product search result, as determined in FIGS. 11-16.

Another example is shown in the GUI 1700 of FIG. 17, where a terry polo shirt 1702 with guayabera-like front pockets and tropical fruit design includes many colors. Even though the choice of which two colors form the two-tone pair may be a bit subjective, many would agree that the dominant color in this example shirt is the burgundy shade and the secondary color is the golden yellow shade of the collar, the sleeve trim, bottom trim, and pocket trim. Again, this may be an aesthetic choice in the assignment or a more detailed analysis of the percentages of each color may be made for a more exact assignment of the two colors. However, this is generally not necessary. In the GUI 1700, the two-tone product color swatch 1712 is shown next to the product 1702 in on or more example embodiments, which communicates to the user the two colors of the product that care being compared to the target two colors.

Figure 10:
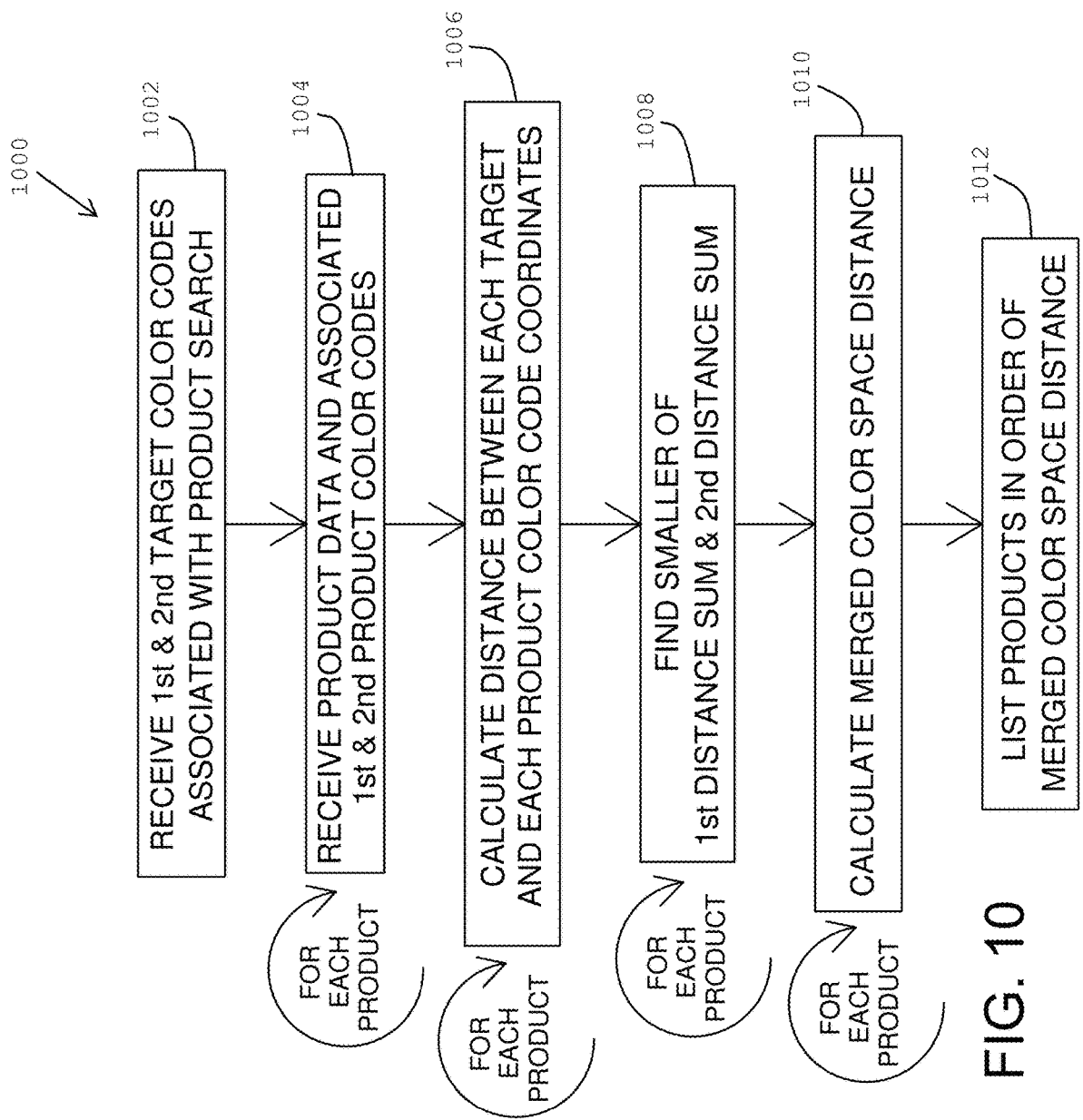
FIG. 10 is flowchart of a method for matching a first and second target color code to a first and second product color codes in a search, according to some example embodiments.

FIG. 10, is flowchart of a method 1000 for determining the color space distance between a target color combination (comprising a first target color and a second target color) and a product color combination (comprising a first product color and a second product color) in order to present the product with the closest color matches before the poorer color matches, according to some example embodiments.

At operation 1002, a first target color code coordinate, a second target color code coordinate, and product search request is received at the server. In one or more embodiments, the target color code coordinate and the second target color code coordinate may require conversion to a standard color code compatible with the present system or may already be in a compatible format.

At operation 1004, a plurality of product descriptions (e.g., data) from one or more databases is received in response to the product search request, where each of the plurality of product descriptions includes a first product color code coordinate and a second product color code coordinate within a color space. As described above, the first product color code coordinate and the second product color code coordinate are assigned at an earlier stage in one or more embodiments. Additionally, certain products are predefined as being two-toned by either that or a similar designation in the data or by the simple fact that there are two product color code coordinates in the data file.

At operation 1006, a first color space distance, a second color space distance, a third color space distance, and a fourth color space distance are each calculated. The problem at this stage of the process, is that it is unknown whether the system is comparing like colors in the target and product two-tone color pairs. Thus, the present system must compare the color space distance for all four possible two-tone color combinations to calculate the most likely comparable pair of two-tone colors. For example, if the first target color code coordinate represents a blue color and the second target color code coordinate represents a red color, it must be determined which of the first product color code coordinate and the second product color code coordinate is most similar to the blue color and which is most similar to the red color. Thus, the blue colored first target color code coordinate must be compared to each of the first product color code coordinate and the second product color code coordinate. And similarly, the red colored second target color code coordinate must be compared to each of the first product color code coordinate and the second product color code coordinate.

Still at operation 1006, a first color space distance between the second target color code coordinate and the first product color point coordinate (for each product) is calculated. A second color space distance between the first target color code coordinate and the second product color code coordinates (for each product) is calculated. A third color space distance, between the first target color code coordinate and the first product color point coordinates (for each product) is calculated. And, a fourth color space distance between a second target color code coordinate and the second product color code coordinates (for each product) is calculated.

The color space distances are each calculated using the ΔE formula of FIG. 4 to obtain $E_1$, $E_2$, $E_3$, and $E_4$ as shown in FIG. 11. Each color (designated as c1 and c2) of the target two-tone color swatch 1104 is compared to each color (designated as c3 and c4) of the product two-tone color swatch 1106. In a first group 1108, the first distance between c2 and c3 and the second distance between c1 and c4 is calculated using the ΔE formula of FIG. 4, to obtain E1=0.49553 and E2=0.43909. In a second group 1110, the third distance between c1 and c3 and the fourth distance between c2 and c4 is calculated using the ΔE formula of FIG. 4, to obtain E3=0.10433 and E4=0.32048.

At operation 1008, and as seen in FIG. 13, a first distance is determined by the sum of the first color space distance and the second color space distance (E1+E2=0.93462), for each product. And, a second distance is determined by the sum of the third color space distance and the fourth color space distance (E3+E4=0.42481), for each product. The first distance is compared to the second distance using, for example, a math.min script to determine the smaller of the two, as described in FIGS. 12 and 13. If it is determined that the first distance is smaller than the second distance, then the third color space distance and the fourth color space distance are discarded, and the first color space distance and the second color space distance are used in further calculations (as shown in the formula of FIG. 15). If it is determined that the second distance is less than the first distance, then the first color space distance and the second color space distance are discarded, and the third color space distance and the fourth color space distance are used in further calculations (as shown in the formula of FIG. 16). Here, in FIG. 13, it can be seen that the second distance (E3+E4) is less than the first distance (E1+E2). Thus, in this example, the values of the third color space distance (E3) and the fourth color space distance (E4) are used in the next step of the process.

Basically, it is presumed by the system that the smaller of the first distance and the second distance is most likely comparing like colors in the comparison of the target two-tone colors with each of the product two-tone colors. In the above example, the target red tone will be compared to a product color closer to red; and the target blue tone will be compared to a product color closer to blue. However, if the product two-tone colors are, for example, white and black, which are quite different than red and blue, one or more the first, second, third, and fourth color space distances is likely to be greater than the maximum color space distance permitted. Thus, the operation can be stopped early for a given product when the one, two, three, or all four of the color space distances are greater than the maximum.

At operation 1010 and as seen in FIG. 16, a merged color space distance is calculated, where the magnitude of the merged color space distance is between an addend distance and an augend distance of the smaller sum as determined at operation 1008. In one or more embodiments, if (E1+E2)< (E3+E4), then E1 and E2 are assigned as the addend and augend (in no particular respective order) of the formula of FIG. 14. In one or more embodiments, if (E1+E2)>(E3+E4), then E3 and E4 are assigned as the addend and augend (in no particular respective order) of the formula of FIG. 15.

Broadly speaking, the formulas of FIGS. 14 and 15 are not necessarily required. When comparing E1 to E2, or when comparing E3 to E4, one color space distance will be smaller than the other. The system can simply assign a merged color space distance by selecting a distance magnitude between the magnitudes of E1 and E2 (when this pair of numbers is used to determine the merged color space). Or, the system can simply assign a merged color space distance by selecting a distance magnitude between the magnitudes of E3 and E4 (when this pair of numbers is used to determine the merged color space).

It is found that a more effective or truer two-tone color match can be made when the initial magnitude of an initial midpoint between the magnitudes of the addend and augend is calculated; then the final magnitude of the final midpoint between the initial midpoint and smaller of the addend and the augend is calculated, where the final magnitude is the merged color space distance (which is the result of applying the formulas of FIGS. 14 and 15). More directly, the merged color space distance is ¼ the difference between addend distance and augend distance added to the smaller of the addend distance and the augend distance. In one or more embodiments, the merged color space distance is approximately ½ the difference between addend distance and augend distance added to the smaller of the addend distance and the augend distance. In one or more embodiments, the merged color space distance is approximately ⅛ the difference between addend distance and augend distance added to the smaller of the addend distance and the augend distance. In one or more embodiments, the merged color space distance is approximately ¾ the difference between addend distance and augend distance added to the smaller of the addend distance and the augend distance. In one or more embodiments, the merged color space distance is approximately ¼ the difference between addend distance and augend distance added to the smaller of the addend distance and the augend distance.

Each step of the calculations provided by the method herein is illustrated in FIG. 11, FIG. 13, and FIG. 16, where the steps illustrated in FIGS. 11 and 13 are to determine the which two of the four possible two-tone color combinations are to be compared between the target colors and the product colors. Then, the step illustrated in FIG. 16 determines the merged color space distance (Je) using the best match of earlier steps. These operations occur for each two-tone color product within the search result.

At operation 1012, the two-tone product search results are ordered from smaller merged color space distance magnitude to larger merged color space distance magnitude. These product descriptions are presented to the user in the GUI in this order, to give the more pertinent products that are closer in color to the target color higher priority, visually in the GUI.

Figure 18:
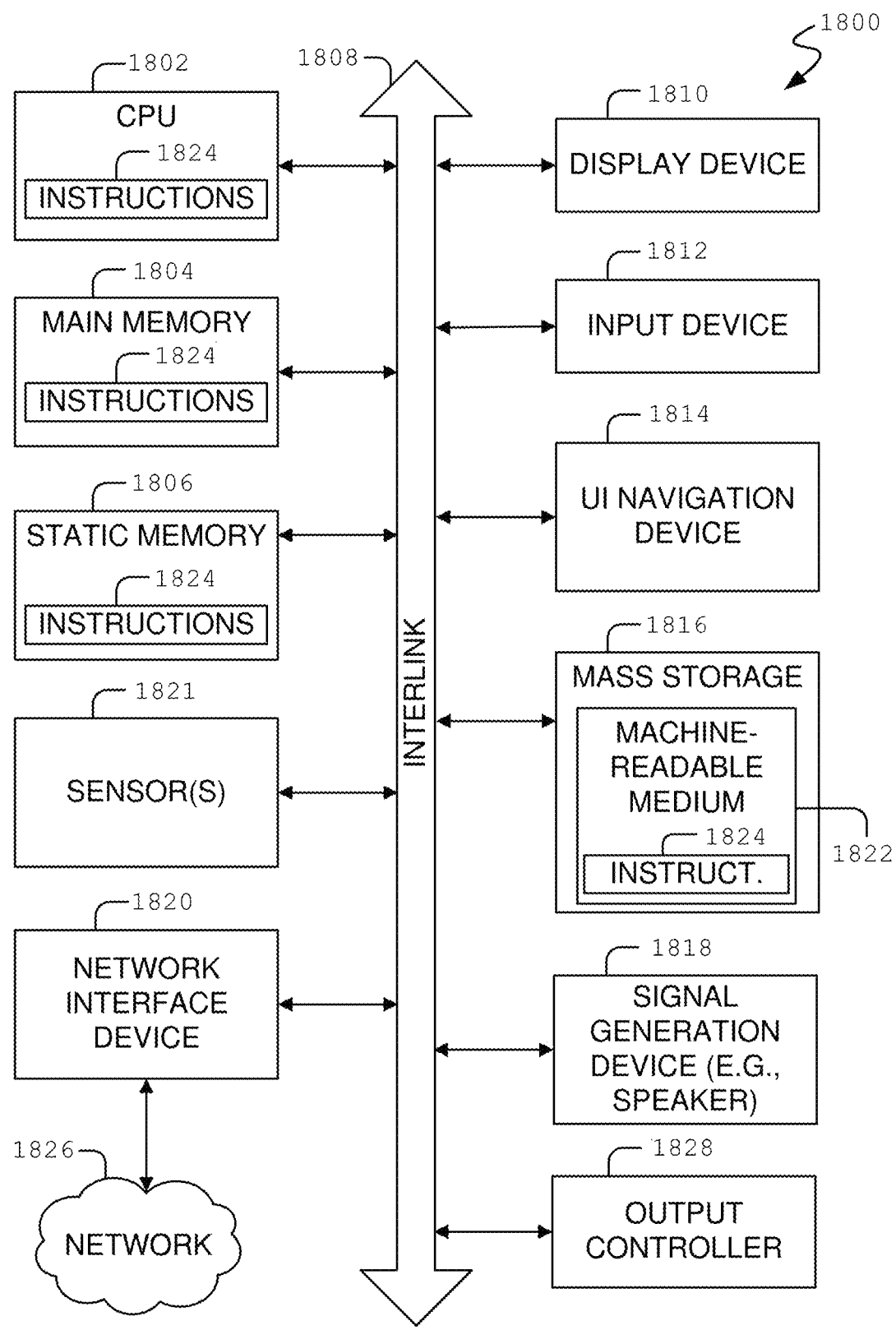
FIG. 18 schematically depicts a high-level diagram of hardware that may be used to implement various aspects of the present system in certain embodiments.

FIG. 18 is a block diagram illustrating an example of a machine 1800 upon which one or more example embodiments may be implemented. In alternative embodiments, the machine 1800 may operate as a standalone device or may be connected (e.g., networked) to other machines. In a networked deployment, the machine 1800 may operate in the capacity of a server machine, a client machine, or both in server-client network environments. In an example, the machine 1800 may act as a peer machine in peer-to-peer (P2P) (or other distributed) network environment. The machine 1800 may be a personal computer (PC), a tablet PC, a set-top box (STB), a laptop, a mobile telephone, a web appliance, a network router, switch or bridge, or any machine capable of executing instructions (sequential or otherwise) that specify actions to be taken by that machine. Further, while only a single machine 1800 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1800 may include a Central Processing Unit (CPU) 1802, a main memory 1804, and a static memory 1806, some or all of which may communicate with each other via an interlink (e.g., bus) 1808. The machine 1800 may further include a display device 1810, one or more input devices 1812 (e.g., a keyboard, a microphone, a touchscreen, a game controller, a remote control, a camera, dedicated buttons), and one or more user interface navigation devices 1814 (e.g., a mouse, a touchpad, a touchscreen, a joystick, a gaze tracker). In an example, the display device 1810, input devices 1812, and user interface navigation devices 1814 may include a touchscreen display. The machine 1800 may additionally include a mass storage device (e.g., drive unit) 1816, a signal generation device 1818 (e.g., a speaker), a network interface device 1820, and one or more sensors 1821, such as a Global Positioning System (GPS) sensor, compass, accelerometer, magnetometer, or other sensors. The machine 1800 may include an output controller 1828, such as a serial (e.g., universal serial bus (USB), parallel, or other wired or wireless (e.g., infrared (IR), near field communication (NFC), etc.) connection to communicate or control one or more peripheral devices (e.g., a printer, a card reader, etc.).

The mass storage device 1816 may include a machine-readable medium 1822 on which is stored one or more sets of data structures or instructions 1824 (e.g., software) embodying or utilized by any one or more of the techniques or functions described herein. The instructions 1824 may also reside, completely or at least partially, within the main memory 1804, within the static memory 1806, or within the CPU 1802 during execution thereof by the machine 1800. In an example, one or any combination of the CPU 1802, the main memory 1804, the static memory 1806, or the mass storage device 1816 may constitute machine-readable media.

While the machine-readable medium 1822 is illustrated as a single medium, the term "machine-readable medium" may include a single medium or multiple media (e.g., a centralized or distributed database, and/or associated caches and servers) configured to store the one or more instructions 1824.

The term "machine-readable medium" may include any medium that is capable of storing, encoding, or carrying instructions 1824 for execution by the machine 1800 and that causes the machine 1800 to perform any one or more of the techniques of the present disclosure, or that is capable of storing, encoding or carrying data structures used by or associated with such instructions 1824. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1824 may further be transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 1102.11 family of standards known as Wi-Fi®, IEEE 1102.16 family of standards known as WiMax®), IEEE 1102.15.4 family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 1824 for execution by the machine 1800, and includes digital or analog communications signals or other intangible medium to facilitate communication of such software.

Aspects of the present specification may also be described as follows:

1. A computer-implemented method comprising receiving a color selection within a product search parameter from a user computing device, the color selection comprising a color code; responsive to receiving the product search parameter, processing the product search parameter to obtain a plurality of product descriptions from one or more databases storing the plurality of product descriptions, each of the plurality of product descriptions comprising a product color point coordinate within a three-dimensional color space, each of the product color point coordinates being associated with a product color; responsive to receiving the color selection, assigning, by one or more processors, the color code to a target color point coordinate within the three-dimensional color space; calculating, by one or more processors, a color space distance between the target color point coordinate and each of the product color point coordinates; and presenting, in a graphical user interface, a search result comprising the plurality of product descriptions presented in respective order of the color space distance.

2. The computer-implemented method wherein the three-dimensional color space is a Euclidean space and the color space distance is a Euclidean distance.

3. The computer-implemented method wherein assigning the color code to the target color point location comprises: converting, by one or more processors, the color code to a Lab color code which comprises an L coordinate component, an a coordinate component, and a b coordinate component of the target color point coordinate.

4. The computer-implemented method further comprising: comparing, by one or more processors, each of the color space distances to a color space distance maximum; and excluding from the search result a portion of the plurality of product descriptions associated with the color space distances that are greater than the color space distance maximum.

5. The computer-implemented method further comprising: selecting, within the graphical user interface, the color using a color picker tool, wherein the color can be selected using one or both of a color field of the color picker tool and an eye dropper of the color picker tool, the eye dropper being used to select a color from a product image displayed in the graphical user interface.

6. A computer-implemented method comprising: receiving a color selection within a product search parameter from a user computing device, the color selection comprising a first color code and a second color code; responsive to receiving the product search parameter, processing the product search parameter to obtain a plurality of product descriptions from one or more databases storing the plurality of product descriptions, each of the plurality of product descriptions comprising a first product color point coordinate and a second product color point coordinate within a three-dimensional color space, each of the first product color point coordinates associated with a first product color and each of the second product color point coordinates associated with a second product color; responsive to receiving the color selection, assigning, by one or more processors, the first color code to a first target color point coordinate and the second color code to a second target color point coordinate within the three-dimensional color space;

calculating, by one or more processors, for each of the plurality of product descriptions:

a first color space distance between the second target color point coordinate each of the first product color point coordinates, a second color space distance between the first target color point coordinate and each of the second product color point coordinates, a third color space distance, between the first target color point coordinate and each of the first product color point coordinates, and a fourth color space distance between a second target color point coordinate and each of the second product color point coordinates; calculating, by one or more processors, for each of the plurality of product descriptions:

a first distance sum of the first color space distance and the second color space distance, and a second distance sum of the third color space distance and the fourth color space distance; calculating, by one or more processors, a smaller sum of the first distance sum and the second distance sum, for each of the plurality of product descriptions; calculating a merged color space distance with a magnitude between an addend distance and an augend distance of the smaller sum; and presenting, in a graphical user interface, a search result comprising the plurality of product descriptions presented in respective order of the merged color space distance.

7. The computer-implemented method further comprising: comparing, by one or more processors, each of the merged color space distances to a merged color space distance maximum; and excluding from the search result a portion of the plurality of product descriptions associated with the merged color space distances that are greater than the merged color space distance maximum.

8. The computer-implemented method of wherein when the smaller sum comprises the first distance sum, the addend distance is the first color space distance and the augend distance is the second color space distance; and wherein when the smaller sum comprises the second distance sum, the addend distance is the third color space distance and the augend distance is the fourth color space distance.

9. The computer-implemented method wherein when the smaller sum comprises the first distance sum, the addend distance is the second color space distance and the augend distance is the first color space distance; and wherein when the smaller sum comprises the second distance sum, the addend distance is the fourth color space distance and the augend distance is the third color space distance.

10. The computer-implemented method where determining the merged color space distance further comprises: calculating, by one or more processors, an intermediary merged color space distance with an intermediary magnitude approximately midway between the addend distance and the augend distance of the smaller sum, where the augend distance is smaller than the addend distance; and calculating, by one or more processors, the merged color space distance with the magnitude approximately midway between the augend distance and the intermediary merged color space distance.

11. A system comprising: a server having access to one or more processors and a user device; and a non-transitory physical medium for storing program code and accessible by the server, the program code when executed by the processor causes the processor to:

receive a color selection within a product search parameter from the user device, the color selection comprising a color code; process the product search parameter to obtain a plurality of product descriptions from one or more databases storing the plurality of product descriptions, each of the plurality of product descriptions comprising a product color point coordinate within a three-dimensional color space, each of the product color point coordinates being associated with a product color; assign the color code to a target color point coordinate within the three-dimensional color space; calculate a color space distance between the target color point coordinate and each of the product color point coordinates; compare each of the color space distances to a color space distance maximum and exclude from the search result a portion of the plurality of product descriptions associated with the color space distances that are greater than the color space distance; and present, in a graphical user interface, the search result comprising the plurality of product descriptions presented in respective order of the color space distance.

12. The system wherein the processor is further caused to: receive a selection, selected from within the graphical user interface, the color from manipulation of a color picker tool, wherein the color can be selected using one or both of a color field of the color picker tool and an eye dropper of the color picker tool, the eye dropper being used to select a color from a product image displayed in the graphical user interface.

14. A computer-implemented method comprising: receiving, by a server, a product search request limited by a target color code coordinate within a color space; responsive to receiving the product search request, processing the product search request to retrieve a plurality of product descriptions from one or more databases associated with the server and storing the plurality of product descriptions, each of the plurality of product descriptions comprising a product color code coordinate within the color space; calculating, by one or more processors, a color space distance between the target color code coordinate and each of the product color code coordinates associated with the plurality of product descriptions; and presenting, in a graphical user interface, a search result comprising the plurality of product descriptions presented in respective order of the color space distance.

15. The computer-implemented method of claim 1 wherein assigning the color code to the target color point location comprises: converting, by one or more processors, the product color code coordinate to a Lab color code coordinate which comprises an L coordinate component, an a coordinate component, and a b coordinate component.

16. The computer-implemented method further comprising: comparing, by one or more processors, each of the color space distances to a color space distance maximum; and excluding from the search result a portion of the plurality of product descriptions associated with the color space distances that are greater than the color space distance maximum.

17. The computer-implemented method further comprising: selecting, within the graphical user interface, the color using a color picker tool, wherein a color can be selected using one or both of a color field of the color picker tool and an eye dropper of the color picker tool, the eye dropper being used to select the color from a product image displayed in the graphical user interface, the color being expressible as the target color code coordinate.

18. A computer-implemented method comprising: receiving, by a server, a product search request limited by a first target color code coordinate and a second target color code coordinate within a color space; responsive to receiving the product search request, processing the product search request to obtain a plurality of product descriptions from one or more databases storing the plurality of product descriptions, each of the plurality of product descriptions comprising a first product color code coordinate and a second product color code coordinate within the color space; calculating, by one or more processors, for each of the plurality of product descriptions: a first color space distance between the second target color code coordinate and the and each of the first product color code coordinates, a second color space distance between the first target color code coordinate and the and each of the second product color code coordinates, a third color space distance, between the first target color code coordinate and the and each of the first product color code coordinates, and a fourth color space distance between a second target color code coordinate and the and each of the second product color code coordinates; calculating, by one or more processors, for each of the plurality of product descriptions:
 a first distance sum of the first color space distance and the second color space distance, and a second distance sum of the third color space distance and the fourth color space distance; calculating, by one or more processors, the least of the first distance sum and the second distance sum, for each of the plurality of product descriptions;
 calculating a merged color space distance having a magnitude between an addend distance and an augend distance of the least of the first distance sum and the second distance sum; and presenting, in a graphical user interface, a search result comprising the plurality of product descriptions presented in respective order of the merged color space distance.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method for presenting a listing of products based on proximity to a desired color, comprising:
 a server receiving a color selection of the desired color and a product search parameter from a user computing device, the color selection comprising a color code;
 responsive to receiving the product search parameter, the server processing the product search parameter to obtain a plurality of product descriptions that match the product search parameter from one or more databases storing the plurality of product descriptions, each of the plurality of product descriptions comprising a product color point coordinate, each of the product color point coordinates being associated with a product color;
 responsive to receiving the color selection, the server assigning the color code to a target color point coordinate;
 the server calculating a color space distance between the target color point coordinate and each of the product color point coordinates; and
 transmitting to the user computing device, a search result comprising the listing of products and the plurality of product descriptions presented based on the color space distance reflecting proximity to the desired color.

2. The computer-implemented method of claim 1 wherein the product color point coordinate and the target color point coordinate are within a three dimensional color space, and wherein the three-dimensional color space is a Euclidean space and the color space distance is a Euclidean distance.

3. The computer-implemented method of claim 2 further comprising:
 the server comparing each of the color space distances to a color space distance maximum; and excluding from the search result a portion of the plurality of product descriptions associated with the color space distances that are greater than the color space distance maximum.

4. The computer-implemented method of claim 3 wherein assigning the color code to the target color point location comprises:
the server converting the color code to a Lab color code which comprises an L coordinate component, an a coordinate component, and a b coordinate component of the target color point coordinate.

5. The computer-implemented method of claim 1, wherein the search result comprises the plurality of product descriptions presented in respective order of the color space distance.

6. The computer-implemented method of claim 1 further comprising:
the server comparing each of the color space distances to a color space distance maximum; and
excluding from the search result a portion of the plurality of product descriptions associated with the color space distances that are greater than the color space distance maximum.

7. A computer-implemented method for presenting a listing of products based on proximity to a desired color comprising:
a server receiving a color selection of the desired color and a product search parameter from a user computing device, the color selection comprising a first color code and a second color code;
responsive to receiving the product search parameter, the server processing the product search parameter to obtain a plurality of product descriptions that match the product search parameter from one or more databases storing the plurality of product descriptions, each of the plurality of product descriptions comprising a first product color point coordinate and a second product color point coordinate, each of the first product color point coordinates associated with a first product color and each of the second product color point coordinates associated with a second product color;
responsive to receiving the color selection, the server assigning the first color code to a first target color point coordinate and the second color code to a second target color point coordinate;
the server calculating for each of the plurality of product descriptions:
a first color space distance between the second target color point coordinate and each of the first product color point coordinates,
a second color space distance between the first target color point coordinate and each of the second product color point coordinates,
a third color space distance, between the first target color point coordinate and each of the first product color point coordinates, and
a fourth color space distance between a second target color point coordinate and each of the second product color point coordinates;
the sever calculating for each of the plurality of product descriptions:
a first distance sum of the first color space distance and the second color space distance, and
a second distance sum of the third color space distance and the fourth color space distance;
the server calculating, by one or more processors, a smaller sum of the first distance sum and the second distance sum, for each of the plurality of product descriptions;
the server calculating a merged color space distance with a magnitude between an addend distance and an augend distance of the smaller sum; and
transmitting to the user computing device, a search result comprising the listing of products and the plurality of product descriptions presented based on the merged color space distance reflecting proximity to the desired color.

8. The computer-implemented method of claim 7 further comprising:
the server comparing each of the merged color space distances to a merged color space distance maximum; and
excluding from the search result a portion of the plurality of product descriptions associated with the merged color space distances that are greater than the merged color space distance maximum.

9. The computer-implemented method of claim 7 wherein when the smaller sum comprises the first distance sum, the addend distance is the first color space distance and the augend distance is the second color space distance; and wherein when the smaller sum comprises the second distance sum, the addend distance is the third color space distance and the augend distance is the fourth color space distance.

10. The computer-implemented method of claim 7 wherein when the smaller sum comprises the first distance sum, the addend distance is the second color space distance and the augend distance is the first color space distance; and wherein when the smaller sum comprises the second distance sum, the addend distance is the fourth color space distance and the augend distance is the third color space distance.

11. The computer-implemented method of claim 7 wherein determining the merged color space distance further comprises:
the server calculating an intermediary merged color space distance with an intermediary magnitude approximately midway between the addend distance and the augend distance of the smaller sum, where the augend distance is smaller than the addend distance; and
the server calculating the merged color space distance with the magnitude approximately midway between the augend distance and the intermediary merged color space distance.

12. The computer-implemented method of claim 7 wherein the search result comprising the plurality of product descriptions is transmitted in respective order of the merged color space distance.

13. A system for presenting a listing of products based on proximity to a desired color, comprising:
a server comprising one or more processors and configured to communicate with a user device; and
a non-transitory physical medium for storing program code and accessible by the server, the program code when executed by the one or more processors causes the one or more processors to:
receive a color selection of the desired color and a product search parameter from the user device, the color selection comprising a color code;
process the product search parameter to obtain a plurality of product descriptions that match the product search parameter from one or more databases storing the plurality of product descriptions, each of the plurality of product descriptions comprising a product color point coordinate, each of the product color point coordinates being associated with a product color;

assign the color code to a target color point coordinate;

calculate a color space distance between the target color point coordinate and each of the product color point coordinates; and transmit to the user device the search result comprising the listing of products and the plurality of product descriptions presented based on the color space distance reflecting proximity to the desired color.

14. The system of claim 13 wherein the processor is further caused to:

receive a selection, selected from within the graphical user interface, the color from manipulation of a color picker tool, wherein the color can be selected using one or both of a color field of the color picker tool and an eye dropper of the color picker tool, the eye dropper being used to select a color from a product image displayed in the graphical user interface.

15. The system of claim 13, wherein transmitting to the user device the search result comprises the plurality of product descriptions presented in respective order of the color space distance.

16. A computer-implemented method for presenting a listing of products based on proximity to a desired color, comprising the steps of:

a user computing device sending a color selection of the desired color and a product search parameter to a server, the color selection comprising a color code;

the user computing device receiving a plurality of product descriptions that match the product search parameter from the server;

displaying in a graphical user interface of the user computing device, the listing of products and the plurality of product descriptions presented based on a color space distance of each product description reflecting proximity to the desired color, wherein each of the plurality of product descriptions comprises a product color point coordinate associated with a product color;

wherein the color code is associated with a target color point coordinate;

wherein the color space distance of each product description is calculated between the target color point coordinate and each of the product color point coordinates, respectively.

17. The computer-implemented method of claim 16 further comprising the step of:

providing a color picker tool within the graphical user interface for the color selection.

18. The computer-implemented method of claim 17, wherein the color picker tool is configured to select a color from a product image displayed in the graphical user interface.

19. The computer-implemented method of claim 17 wherein the product color point coordinate and the target color point coordinate are within a three dimensional color space, and wherein the three-dimensional color space is a Euclidean space and the color space distance is a Euclidean distance.

20. The computer-implemented method of claim 19 further comprising the step of:

the processor comparing each of the color space distances to a color space distance maximum; and excluding from the step of displaying in a graphical user interface of the user computing device, a portion of the plurality of product descriptions associated with the color space distances that are greater than the color space distance maximum.

21. The computer-implemented method of claim 20 wherein assigning the color code to the target color point location comprises:

a processor converting the color code to a Lab color code which comprises an L coordinate component, an a coordinate component, and a b coordinate component of the target color point coordinate.

* * * * *